United States Patent [19]

Anderson et al.

[11] Patent Number: 5,265,641
[45] Date of Patent: Nov. 30, 1993

[54] RESETTABLE AUTOMATIC SHUT-OFF VALVE

[76] Inventors: James B. Anderson; Patrick J. Anderson; Derrick D. Anderson, all of P.O. Box 652, Belleville, Mich. 48112-0652

[21] Appl. No.: 36,981
[22] Filed: Mar. 25, 1993

Related U.S. Application Data

[63] Continuation-in-part of Ser. No. 742,346, Aug. 8, 1991.
[51] Int. Cl.$^5$ .............................................. F16K 17/28
[52] U.S. Cl. ...................................... 137/460; 137/377
[58] Field of Search ............... 137/460, 202, 382, 383, 137/57, 377, 519.5

[56] References Cited

U.S. PATENT DOCUMENTS

| | | | |
|---|---|---|---|
| 1,159,518 | 11/1915 | Maul | 137/519.5 |
| 2,426,510 | 8/1947 | Kelly | 137/519.5 |
| 2,949,748 | 8/1960 | Gangi | 137/519.5 X |
| 3,055,391 | 9/1962 | Shuk et al. | 137/519.5 X |
| 3,407,827 | 10/1968 | Follett | 137/460 X |
| 3,941,145 | 3/1976 | Morain et al. | 137/460 X |
| 4,071,038 | 1/1978 | Robinson | 137/460 X |
| 4,257,448 | 3/1981 | Shiu et al. | 137/460 |
| 4,889,150 | 12/1989 | Lloyd et al. | 137/460 X |

FOREIGN PATENT DOCUMENTS 0112464 8/1980 Japan .................... 137/460

*Primary Examiner*—Martin P. Schwadron
*Assistant Examiner*—Kevin L. Lee
*Attorney, Agent, or Firm*—Basile and Hanlon

[57] ABSTRACT

A valve adapted to be disposed in a conduit for a flowing substance which may be a liquid or gas comprises a lower valve housing for allowing fluid under pressure to enter the valve. As flow under pressure enters the valve body it forces a float ball to float inside the valve body. When a rupture in the conduit occurs and allows the flowing substance to exceed the normal amount of pressure, the float ball rises to and engages an upper valve housing ball seat where the float ball sits thereby sealing and shutting off the valve from escape of the flowing substance. When the problem has been rectified, the valve can be reactivated by removing a lock member and simply pressing a reset button.

3 Claims, 2 Drawing Sheets

RESETTABLE AUTOMATIC SHUT-OFF VALVE

CROSS-REFERENCE TO CO-PENDING APPLICATION

This application is a continuation in part of co-pending application, Ser. No. 07/742,346, filed Aug. 8, 1991 in the names of James B. Anderson, Patrick J. Anderson and Derrick D. Anderson.

BACKGROUND OF THE INVENTION

1. Field of the Invention

This invention relates to an automatic shut off valve adapted to be disposed in a conduit for a flowing medium which may be a liquid or a gas.

2. Description of the Art

Many, if not most consumers of natural gas (or any other flowing substance) would prefer a safety device that would automatically shut off the flow of gas (or liquid) in the event of any rupture in the conduit, thereby causing the supplied quantity of the flowing medium to increase abruptly.

Heretofore a wide variety of automatic shut off, excess flow, globe, and pipe rupture valves have been proposed and implemented for such reasons.

One such valve, The Excess Flow Valve in U.S. Pat. No. 4,093,001 to Sandin, Jun. 6, 1978, consisted of a valve disc with a two-arm lever. In the event of a discrepancy in flowing medium, said valve would close rapidly. Users regarded this type of valve as unsatisfactory because once engaged someone skilled and trained would be required to reset it.

Other such valves employ numerous movable parts to perform the required function, therefore, requiring some skill or training on part of said users and also increasing the likelihood of failure due to failed parts.

Most users, therefore, would find it desirable to have a valve which provides a simpler construction without sacrificing functions, and which provides somewhat different features and mode of operation.

SUMMARY OF THE INVENTION

Accordingly we claim the following as our objects and advantages of the invention: to provide a valve to easily and reliably shut off flowing substance from a conduit in event of rupture, thereby preventing damaging effects as the result of escaping medium, to provide such a valve with additional features to decrease likelihood of failure, to provide such a valve which requires a minimum of skill and trailing to use, and to provide such a valve with various internal parts which are such that they can be readily removed in order to enable the valve to be cleaned out from time to time should that be necessary.

The valve includes an elongated valve body having a fluid flow passage extending therethrough. An outlet flow passage is formed in an upper portion of the valve body and disposed in fluid flow communication with the fluid flow passage in the valve body. A ball seat is formed in the valve body at one end of the outlet flow passage, with the outlet flow passage communicating through the ball seat with the fluid flow passage in the valve body. A bore is formed in the upper portion of the valve body and extends from an exterior surface of the upper portion of the valve body to the ball seat. A spring-biased reset button is movably mounted in the bore and is reciprocally extendable through the ball seat into the fluid flow passage in the valve body. Removable lock means are mountable in the bore for preventing access to the reset button externally from the valve body. An inlet flow passage is formed in a lower portion of the valve body and disposed in fluid flow communication with the fluid flow passage in the valve body. A float ball is disposed in the fluid flow passage in the valve body and is moveable from a normal position adjacent the lower portion of the valve body into engagement with the ball seat in the event of a rupture of the conduit to block the flow of fluid through the outlet flow passage.

Readers will find further objects and advantages of the invention from a consideration of the ensuing description and the accompanying drawings.

DESCRIPTION OF THE PREFERRED EMBODIMENT

Figure 1:
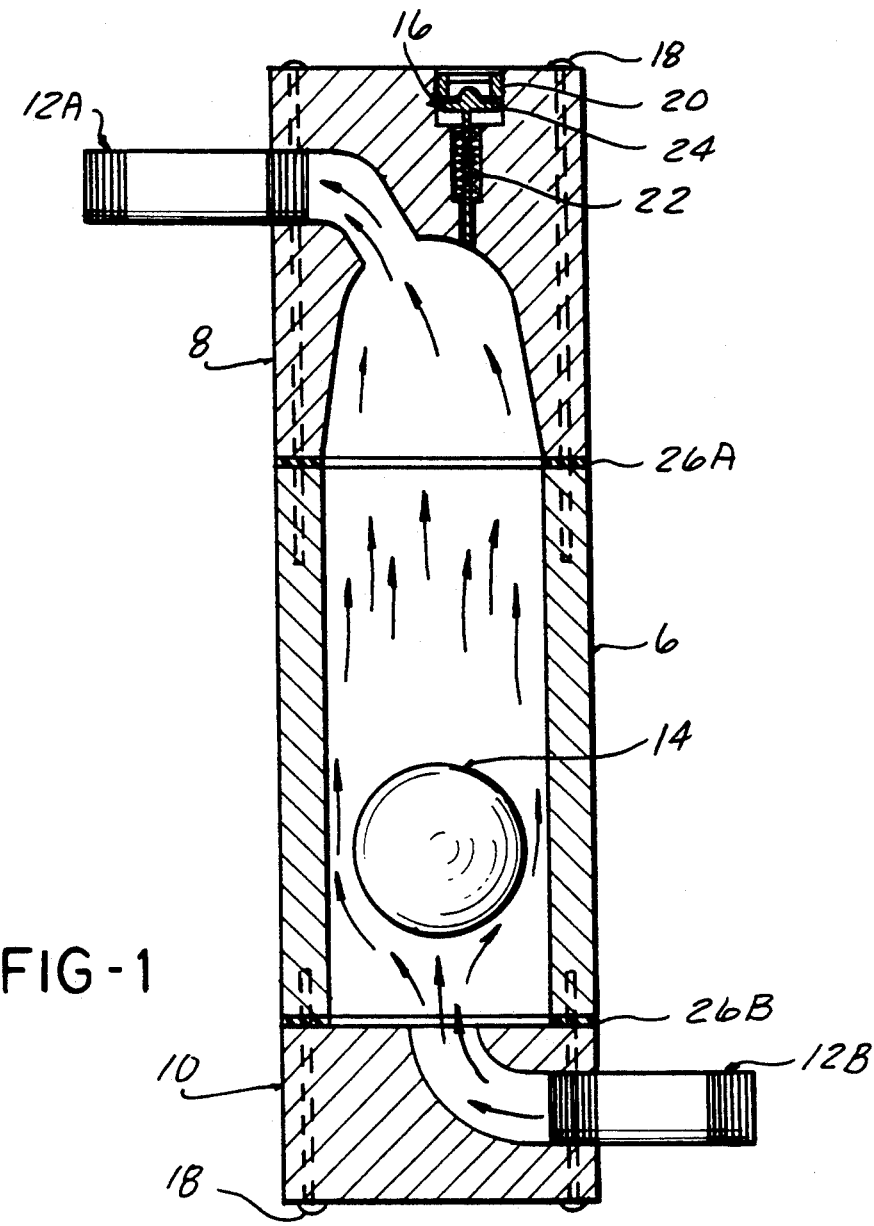
FIG. 1 is a longitudinal cross section taken through a valve incorporating the present invention.
Figure 2:
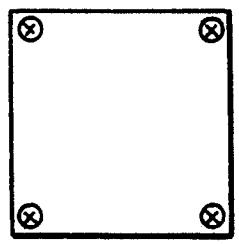
FIG. 2 is a top view of present invention.
Figure 3:
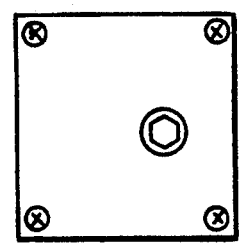
FIG. 3 is a bottom view of present invention.

FIG. 1 shows an automatic shut off valve according to the preferred embodiment of the invention. The valve comprises an upper valve housing 8 with a ball seat having an outlet flow passage extendinh therethrough and providing a housing for reset button 16. An upstream portion of said housing 8 defines a ball seat and is internally threaded for attachment to outlet coupling 12A, and is attached to valve body 6. Valve body 6 which is an elongated member having a longitudinal axis, with an outlet flow passage extending through, provides a housing for float ball 14. Float ball 14 has weight and size determined by amount of pressure passing through valve. Lower valve housing 10 is connected to a downstream end of the valve body 6 and has an inlet flow passage extending through. The lower valve housing is internally threaded for attachment to inlet coupling 12B. Gaskets 26A and 26B will be placed between upper valve housing 8 and body 6, and between body 6 and lower valve housing 10 to reduce potential leakage to a minimum. Valve screws 18 are required to assemble the valve.

Figure 4:
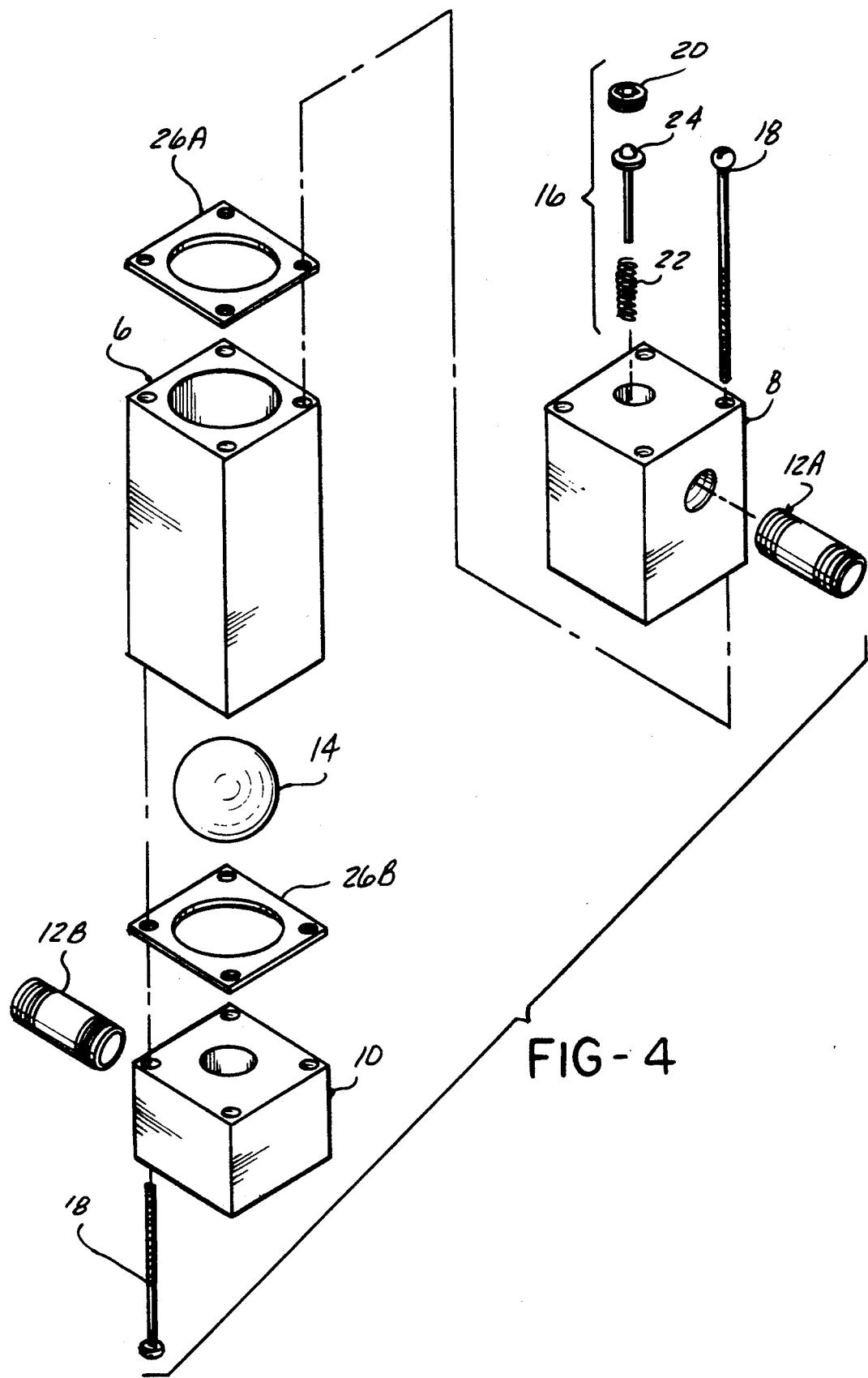
FIG. 4 is an exploded view of present invention.

FIG. 4 best shows the required parts of the reset button assembly 16 as shown in FIG. 1. Reset button assembly 16 comprises a reset spring 22 and a button and pin assembly 24.

Automatic Shut Off Valve—Operation

The automatic shut off valve of FIG. 1 will perform when attached to a wide variety of conduits, gas pumps at service station, oil fields or oilwells, bulk gas supplies, etc., but users will find it most useful for shutting off flow from natural gas meters in case of a fire emergency in a home. For this function, the valve will operate in this manner.

The valve will be attached to gas meter and line to a home by couplings, i.e., inlet coupling 12B and outlet coupling 12A. As fluid under pressure enters lower valve housing 10 through inlet coupling 12B and flows upstream through the valve body 6, it will engage float ball 14, and pass through upper valve housing 8 and exits through outlet coupling 12A, making way to gas appliances inside a home. Attached to the gas appliances is a gas flex line, which is attached to downstream flow lines. If fire erupts and burns through the flex line, pressure differential with the valve will force the float ball 14 upstream to the upper valve housing 8 with the float ball 14 engaging ball seat 8, where it will be forced to sit, preventing fluid from exiting and, thus, shutting off the flow passage from the valve. The valve can only be reactivated by pressing the reset button 24.

A removable lock means 20 is mounted in the bore in the upper valve housing 8 contacting the reset button 24 for preventing access to the reset button 24 externally from the valve. The lock means 20 has a solid end wall to completely close off the bore in the upper valve housing 8 when mounted therein. Preferably, the lock means 20 comprises a threaded Allen head lock stud which is threadingly engageable with threads in the bore containing the reset button 22. The Allen head lock stud 20 also acts as a stop limiting movement of the reset button 24 under the biasing force of the reset spring 22. It can be seen that the Allen head lock stud 20 prevents access to the reset button 24 unless a mating Allen head wrench is used to remove the Allen head lock stud 20 from the bore in the upper valve housing 8. When the Allen head lock stud is removed, the reset button 24 can be depressed to force the float ball 14 away from the seat in the upper valve housing 8 to enable gas flow through the valve to resume.

While we have described the process of shutting off a gas meter's flow passage to a home in case of fire with the valve of the invention in some detail, in practice we have found that it can be performed very rapidly and efficiently.

Thus the reader will see that the present valve provides a highly reliable, lightweight, yet economical device which can be used by users of almost any age with the appropriate lock removal tool.

While the above description contains many specificities, these should not be construed as limitations on the scope of the invention, but rather as an exemplification of one preferred embodiment thereof. Many other variations are possible. For example, skilled artisans will readily be able to change the dimensions and shapes of the various elements. They will also be able to make the valve of alternative materials, such as brass, steel, and aluminum. Accordingly, the reader is requested to determine the scope of the invention by the appended claims and their legal equivalents, and not by the examples which have been given.

What is claimed is:

1. A valve for automatically shutting off downstream fluid flow from a conduit comprising:
    an elongated valve body having a fluid flow passage extending therethrough;
    an outlet flow passage formed in an upper portion of the valve body and disposed in fluid flow communication with the fluid flow passage in the valve body;
    a ball seat formed in the valve body at one end of the outlet flow passage, with the outlet flow passage communicating through the ball seat with the fluid flow passage in the valve body;
    a bore formed in the upper portion of the valve body and extending from an exterior surface of the upper portion of the valve body to the ball seat;
    a spring-biased reset button movably mounted in the bore and reciprocally extendable through the ball seat into the fluid flow passage in the valve body;
    removable lock means mountable in the bore for preventing access to the reset button externally from the valve body;
    an inlet flow passage formed in a lower portion of the valve body and disposed in fluid flow communication with the fluid flow passage in the valve body; and
    a float ball disposed in the fluid flow passage in the valve body and moveable from a normal position adjacent the lower portion of the valve body into engagement with the ball seat in the event of a rupture of the conduit to block the flow of fluid through the outlet flow passage.

2. The valve of claim 1 wherein the lock means comprises:
    an Allen head lock stud threadingly engageable with the bore in the valve body.

3. The valve of claim 1 wherein the lock means has a solid end wall to close off the bore when mounted therein.

* * * * *